(12) United States Patent
Duenckel

(10) Patent No.: US 7,721,804 B2
(45) Date of Patent: May 25, 2010

(54) PROPPANTS FOR GEL CLEAN-UP

(75) Inventor: Robert John Duenckel, Southlake, TX (US)

(73) Assignee: CARBO Ceramics Inc., Houston, TX (US)

( * ) Notice: Subject to any disclaimer, the term of this patent is extended or adjusted under 35 U.S.C. 154(b) by 0 days.

(21) Appl. No.: 12/166,504

(22) Filed: Jul. 2, 2008

(65) Prior Publication Data

US 2009/0008093 A1    Jan. 8, 2009

Related U.S. Application Data

(60) Provisional application No. 60/948,384, filed on Jul. 6, 2007.

(51) Int. Cl.
*E21B 43/267* (2006.01)

(52) U.S. Cl. .................. 166/280.2; 166/308.1; 428/403

(58) Field of Classification Search ........................ None
See application file for complete search history.

(56) References Cited

U.S. PATENT DOCUMENTS

| | | |
|---|---|---|
| 1,942,431 A | 1/1934 | Jung |
| 2,566,117 A | 8/1951 | Christie et al. |
| 2,699,212 A | 1/1955 | Dismukes |
| 2,799,074 A | 7/1957 | Garloni |
| 2,950,247 A | 8/1960 | McGuire, Jr. et al. |
| 2,966,457 A | 12/1960 | Starmann et al. |
| 3,026,938 A | 3/1962 | Huitt et al. |
| 3,075,581 A | 1/1963 | Kern |
| 3,079,243 A | 2/1963 | Ueltz |
| 3,126,056 A | 3/1964 | Harrell |
| 3,241,613 A | 3/1966 | Kern et al. |
| 3,242,032 A | 3/1966 | Schott |
| 3,245,866 A | 4/1966 | Schott |
| 3,347,798 A | 10/1967 | Baer et al. |
| 3,350,482 A | 10/1967 | Bowers |
| 3,399,727 A | 9/1968 | Graham et al. |
| 3,437,148 A | 4/1969 | Colpoys, Jr. |
| 3,486,706 A | 12/1969 | Weyand |
| 3,491,492 A | 1/1970 | Ueltz |

(Continued)

FOREIGN PATENT DOCUMENTS

AR    241543    8/1992

(Continued)

OTHER PUBLICATIONS

International Search Report issued by the ISA/US on Mar. 14, 2006 in connection with International Application No. PCT/US05/12256.

(Continued)

*Primary Examiner*—Zakiya W. Bates
(74) *Attorney, Agent, or Firm*—Haynes and Boone, LLP

(57) ABSTRACT

Methods of incorporating a chemical breaker onto a proppant that will permit release of the breaker after the proppant has been placed in a hydraulic fracture are provided. The methods utilize a chemical breaker coated on the surface of a non-porous proppant grain or placed in the pore space of a porous proppant grain and secondarily coated with an outer layer which can be tailored to delay the release of the breaker.

11 Claims, 2 Drawing Sheets

U.S. PATENT DOCUMENTS

| | | | |
|---|---|---|---|
| 3,497,008 A | 2/1970 | Graham et al. | |
| 3,598,373 A | 8/1971 | Inman | |
| 3,690,622 A | 9/1972 | Brunner et al. | |
| 3,758,318 A | 9/1973 | Farris et al. | |
| 3,810,768 A | 5/1974 | Parsons et al. | |
| 3,856,441 A | 12/1974 | Suzukawa et al. | |
| 3,890,072 A | 6/1975 | Barks | |
| 3,976,138 A | 8/1976 | Colpoys, Jr. et al. | |
| 4,051,603 A | 10/1977 | Kern, Jr. | |
| 4,052,794 A | 10/1977 | Ganiaris | |
| 4,053,375 A | 10/1977 | Roberts et al. | |
| 4,061,596 A | 12/1977 | Matsushita et al. | |
| 4,068,718 A | 1/1978 | Cooke, Jr. et al. | |
| 4,072,193 A | 2/1978 | Sarda et al. | |
| 4,077,908 A | 3/1978 | Stenzel et al. | |
| 4,104,342 A | 8/1978 | Wessel et al. | |
| 4,113,660 A | 9/1978 | Abe et al. | |
| 4,140,773 A | 2/1979 | Stowell et al. | |
| 4,166,147 A | 8/1979 | Lange et al. | |
| 4,195,010 A | 3/1980 | Russell et al. | |
| 4,268,311 A | 5/1981 | VerDow | |
| 4,296,051 A | 10/1981 | Shimamura et al. | |
| 4,303,204 A | 12/1981 | Weston | |
| 4,343,751 A | 8/1982 | Kumar | |
| 4,371,481 A | 2/1983 | Pollock | |
| 4,396,595 A | 8/1983 | Heytmeijer et al. | |
| 4,407,967 A | 10/1983 | Luks | |
| 4,427,068 A | 1/1984 | Fitzgibbon | |
| 4,439,489 A | 3/1984 | Johnson et al. | |
| 4,440,866 A | 4/1984 | Lunghofer et al. | |
| 4,442,897 A | 4/1984 | Crowell | |
| 4,450,184 A | 5/1984 | Longo et al. | |
| 4,462,466 A | 7/1984 | Kachnik | |
| 4,493,875 A | 1/1985 | Beck et al. | |
| 4,521,475 A | 6/1985 | Riccio et al. | |
| 4,522,731 A | 6/1985 | Lunghofer | |
| 4,547,468 A | 10/1985 | Jones et al. | |
| 4,555,493 A | 11/1985 | Watson et al. | |
| 4,618,504 A | 10/1986 | Bosna et al. | |
| 4,623,630 A | 11/1986 | Fitzgibbon | |
| 4,632,876 A | 12/1986 | Laird et al. | |
| 4,639,427 A | 1/1987 | Khaund | |
| 4,652,411 A | 3/1987 | Swarr et al. | |
| 4,654,266 A | 3/1987 | Kachnik | |
| 4,658,899 A | 4/1987 | Fitzgibbon | |
| 4,668,645 A | 5/1987 | Khaund | |
| 4,680,230 A | 7/1987 | Gibb et al. | |
| 4,713,203 A | 12/1987 | Andrews | |
| 4,714,623 A | 12/1987 | Riccio et al. | |
| 4,732,920 A | 3/1988 | Graham et al. | |
| 4,744,831 A | 5/1988 | Beck | |
| 4,840,729 A | 6/1989 | Levine | |
| 4,879,181 A | 11/1989 | Fitzgibbon | |
| 4,894,189 A | 1/1990 | Dave et al. | |
| 4,894,285 A | 1/1990 | Fitzgibbon | |
| 4,911,987 A | 3/1990 | Sakata et al. | |
| 4,921,820 A | 5/1990 | Rumpf et al. | |
| 4,921,821 A | 5/1990 | Rumpf et al. | |
| 4,993,491 A | 2/1991 | Palmer et al. | |
| 5,030,603 A | 7/1991 | Rumpf et al. | |
| 5,120,455 A | 6/1992 | Lunghofer | |
| 5,175,133 A | 12/1992 | Smith et al. | |
| 5,188,175 A | 2/1993 | Sweet | |
| 5,266,243 A | 11/1993 | Kneller et al. | |
| 5,422,183 A | 6/1995 | Sinclair et al. | |
| 5,443,633 A | 8/1995 | Hirsbrunner et al. | |
| 5,597,784 A | 1/1997 | Sinclair et al. | |
| 5,649,596 A | 7/1997 | Jones et al. | |
| 5,654,246 A | 8/1997 | Newkirk et al. | |
| 5,964,291 A | 10/1999 | Bourne et al. | |
| 5,972,835 A | 10/1999 | Gupta | |
| 5,993,988 A | 11/1999 | Ohara et al. | |
| 6,059,034 A | 5/2000 | Rickards et al. | |
| 6,074,754 A | 6/2000 | Jacobsen et al. | |
| 6,080,232 A | 6/2000 | Sperlich et al. | |
| 6,217,646 B1 | 4/2001 | Gervais | |
| 6,319,870 B1 | 11/2001 | Beall et al. | |
| 6,330,916 B1 | 12/2001 | Rickards et al. | |
| 6,364,018 B1 | 4/2002 | Brannon et al. | |
| 6,372,678 B1 | 4/2002 | Youngman et al. | |
| 6,503,676 B2 | 1/2003 | Yamashita et al. | |
| 6,528,157 B1 | 3/2003 | Hussain et al. | |
| 6,582,819 B2 | 6/2003 | McDaniel et al. | |
| 6,632,527 B1 | 10/2003 | McDaniel et al. | |
| 6,725,930 B2 | 4/2004 | Boney et al. | |
| 6,743,269 B2 | 6/2004 | Meyer et al. | |
| 6,749,025 B1 | 6/2004 | Brannon et al. | |
| 6,753,299 B2 | 6/2004 | Lunghofer et al. | |
| 6,766,817 B2 | 7/2004 | da Silva | |
| 6,772,838 B2 | 8/2004 | Dawson et al. | |
| 6,780,804 B2 | 8/2004 | Webber et al. | |
| 6,918,404 B2 | 7/2005 | da Silva | |
| 7,021,379 B2 | 4/2006 | Nguyen | |
| 7,036,591 B2 | 5/2006 | Cannan et al. | |
| 7,041,250 B2 | 5/2006 | Sherman et al. | |
| 7,066,586 B2 | 6/2006 | da Silva | |
| 7,135,231 B1 | 11/2006 | Sinclair et al. | |
| 7,244,398 B2 | 7/2007 | Kotary et al. | |
| 7,270,879 B2 | 9/2007 | McCrary | |
| 7,285,255 B2 | 10/2007 | Kadlec et al. | |
| 7,387,752 B2 | 6/2008 | Canova et al. | |
| 7,426,961 B2 | 9/2008 | Stephenson et al. | |
| 2004/0023818 A1 | 2/2004 | Nguyen et al. | |
| 2004/0040708 A1 | 3/2004 | Stephenson et al. | |
| 2004/0200617 A1 | 10/2004 | Stephenson et al. | |
| 2005/0028976 A1 | 2/2005 | Nguyen | |
| 2005/0028979 A1 | 2/2005 | Brannon et al. | |
| 2005/0077044 A1* | 4/2005 | Qu et al. | 166/279 |
| 2005/0244641 A1 | 11/2005 | Vincent | |
| 2006/0078682 A1 | 4/2006 | McDaniel et al. | |
| 2006/0081371 A1 | 4/2006 | Duenckel et al. | |
| 2006/0135809 A1 | 6/2006 | Kimmich et al. | |
| 2006/0147369 A1 | 7/2006 | Bi et al. | |
| 2006/0162929 A1 | 7/2006 | Urbanek | |
| 2006/0175059 A1 | 8/2006 | Sinclair et al. | |
| 2006/0219600 A1 | 10/2006 | Palamara et al. | |
| 2007/0023187 A1 | 2/2007 | Canova et al. | |
| 2007/0212281 A1 | 9/2007 | Kadlec et al. | |
| 2008/0015103 A1 | 1/2008 | Luscher et al. | |
| 2008/0015531 A1 | 1/2008 | Hird et al. | |
| 2008/0058228 A1 | 3/2008 | Wilson | |
| 2008/0135246 A1 | 6/2008 | Canova et al. | |
| 2008/0220996 A1 | 9/2008 | Duenckel et al. | |
| 2008/0241540 A1 | 10/2008 | Canova et al. | |
| 2009/0008093 A1 | 1/2009 | Duenckel | |
| 2009/0118145 A1 | 5/2009 | Wilson et al. | |

FOREIGN PATENT DOCUMENTS

| | | |
|---|---|---|
| AR | 243222 | 7/1993 |
| AU | 551409 | 1/1983 |
| CA | 1045027 | 12/1978 |
| CA | 1117987 | 2/1982 |
| CA | 1172837 | 8/1984 |
| CA | 1191020 | 7/1985 |
| CA | 1194685 | 10/1985 |
| CA | 1232751 | 2/1988 |
| CA | 2444826 | 4/2004 |
| CH | 647689 | 2/1985 |
| DE | 2921336 | 12/1979 |
| DE | 2948584 | 6/1980 |
| DK | 137042 | 1/1978 |
| DK | 168099 | 7/1983 |
| EA | 006953 | 6/2006 |

| | | |
|---|---|---|
| EA | 007864 | 2/2007 |
| EA | 008825 | 8/2007 |
| EA | 010944 | 12/2008 |
| EP | 0083974 | 7/1983 |
| EP | 0087852 | 9/1983 |
| EP | 0101855 | 3/1984 |
| EP | 0116369 | 8/1984 |
| EP | 0169412 | 1/1986 |
| EP | 402686 | 12/1990 |
| FR | 1483696 | 6/1967 |
| FR | 2280784 | 2/1976 |
| FR | 2486930 | 1/1982 |
| GB | 578424 | 7/1946 |
| GB | 715354 | 9/1954 |
| GB | 715882 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| JP | 88105 | 7/1975 |
| MX | 161299 | 9/1990 |
| PE | 003273 | 11/1983 |
| PH | 18450 | 7/1985 |
| RU | 2014281 | 6/1994 |
| RU | 2079471 | 5/1997 |
| RU | 2083528 | 7/1997 |
| RU | 2090537 | 9/1997 |
| RU | 2098387 | 12/1997 |
| RU | 2098618 | 12/1997 |
| RU | 2099661 | 12/1997 |
| RU | 2107674 | 3/1998 |
| RU | 2112189 | 5/1998 |
| RU | 2112761 | 6/1998 |
| RU | 2121988 | 11/1998 |
| RU | 2129985 | 5/1999 |
| RU | 2129987 | 5/1999 |
| RU | 2133716 | 7/1999 |
| RU | 2140874 | 11/1999 |
| RU | 2140875 | 11/1999 |
| RU | 2147564 | 4/2000 |
| RU | 2147565 | 4/2000 |
| RU | 2147717 | 4/2000 |
| RU | 2150442 | 6/2000 |
| RU | 2151124 | 6/2000 |
| RU | 2151125 | 6/2000 |
| RU | 2151987 | 6/2000 |
| RU | 2154042 | 8/2000 |
| RU | 2155735 | 9/2000 |
| RU | 99107936 | 1/2001 |
| RU | 2163227 | 2/2001 |
| RU | 2166079 | 4/2001 |
| RU | 2168484 | 6/2001 |
| RU | 2178924 | 1/2002 |
| RU | 2180397 | 3/2002 |
| RU | 2183370 | 6/2002 |
| RU | 2183739 | 6/2002 |
| RU | 2191167 | 10/2002 |
| RU | 2191169 | 10/2002 |
| RU | 2191436 | 10/2002 |
| RU | 2192053 | 10/2002 |
| RU | 2196675 | 1/2003 |
| RU | 2196889 | 1/2003 |
| RU | 2198860 | 2/2003 |
| RU | 2203248 | 4/2003 |
| RU | 2206930 | 6/2003 |
| RU | 2211198 | 8/2003 |
| RU | 2212719 | 9/2003 |
| RU | 2215712 | 11/2003 |
| RU | 2003100030/03 | 11/2003 |
| RU | 2002117351 | 1/2004 |
| RU | 2229456 | 5/2004 |
| RU | 2229458 | 5/2004 |
| SU | 422604 | 12/1974 |
| SU | 628136 | 9/1978 |
| SU | 823343 | 4/1981 |
| SU | 857054 | 8/1981 |
| SU | 923998 | 4/1982 |
| SU | 1437428 | 11/1988 |
| VE | 48083 | 7/1990 |
| VE | 49128 | 2/1993 |
| WO | WO 2005/100007 | 10/2005 |
| WO | WO 2006/010036 | 1/2006 |
| WO | WO 2006/032008 | 3/2006 |
| WO | WO 2006/094074 | 9/2006 |
| WO | WO 2007/016268 | 2/2007 |
| WO | WO 2008/008828 | 1/2008 |
| WO | WO 2008/028074 | 3/2008 |
| WO | WO 2009/009370 | 1/2009 |

OTHER PUBLICATIONS

Written Opinion of the International Searching Authority issued by the ISA/US on Mar. 14, 2006 in connection with International Application No. PCT/US05/12256.

Determining Feasibility of Fabricating Light Weight Proppants for Application in Gas and Oil Well Stimulation, Progress Report 10, DOE Contract DE-AC19-79BC10038, Submitted by Terra Tek, Inc., TR 80-77, Jul. 1980.

Light Weight Proppants for Deep Gas Well Stimulation, $2^{nd}$ Annual Report, Jul. 1, 1980-Jun. 30, 1981, published Apr. 1982, DOE Contract AC19-79BC10038, by R.A. Cutler et al, Terra Tek, Inc.

Oxide Ceramic Proppants for Treatment of Deep Well Fractures, SPE 6816, by E.A. Neel, J.L. Parmley, and P.J. Colpoys, Jr. (1977).

Chemical Abstracts, vol. 85, No. 24, Dec. 13, 1976.

Hydraulic Fracturing with a High-Strength Proppant, Claude E. Cooke, Society of Petroleum Engineers of AIME, SPE 6213, 1976.

The Effect of Various Proppants and Proppant Mixtures on Fracture Permeability, Robert R. McDaniel, et al., SPE 7573, 1978.

UCAR Ceramic Props, The Ideal Proppant for Deep Wells and High Compaction Pressures.

DOE Progress Review No. 21 for reporting period Oct. 1-Dec. 31, 1979, Determining Feasibility of Fabricating Light Weight Proppants for Application in Gas and Oil Well Stimulation.

DOE Progress Review No. 22 for reporting period Jan. 1-Mar. 31, 1980, Determining Feasibility of Fabricating Light Weight Proppants for Application in Gas and Oil Well Stimulation.

DOE Progress Review No. 23 for reporting period Apr. 1-Jun. 30, 1980, Determining Feasibility of Fabricating Light Weight Proppants for Application in Gas and Oil Well Stimulation.

DOE Progress Review No. 24 for reporting period Jul. 1-Sep. 31, 1980, Determining Feasibility of Fabricating Light Weight Proppants for Application in Gas and Oil Well Stimulation.

DOE Progress Review No. 26 for reporting period Jan. 1-Mar. 31, 1981, Determine Feasibility of Fabricated Light Weight Proppants for Application in Gas and Oil Well Stimulation.

DOE Progress Review No. 27 for reporting period Apr. 1-Jun. 30, 1981, Determining Feasibility of Fabricating Light Weight Proppants for Application in Gas and Oil Well Stimulation.

Determining Feasibility of Fabricating Light Weight Proppants for Application in Gas and Oil Well Stimulation, Progress Report 2, DOE Contract DE-AC19-79BC10038, Submitted by Terra Tek, Inc., TR 79-77, Oct. 1979.

Light Weight Proppants for Deep Gas Well Stimulation, A. H. Jones et al, Terra Tek, Inc., Jun. 1980, TR Report 80-47.

New Proppants for Deep Gas Well Stimulation, SPE 9869, by Raymond A. Cutler, et al., 1977.

Effect of Grinding and Firing Treatment on the Crystalline and Glass Content and the Physical Properties of Whiteware Bodies; S. C. Sane, et al., 1951.

Nepheline Syenite-Talc Mixtures as a Flux in Low-Temperature Vitrified Bodies; E. D. Lynch, et al., Apr. 1950.

Engineering Properties of Ceramics, Databook to Guide Materials Selection for Structural Applications, J. F. Lynch, et al., TR 66-52, Jun. 1966.
Reactions in Silica-Alumina Mixtures, Richard R. West, et al., Apr. 1958.
Synthesis and Mechanical Properties of Stoichiometric Aluminum Silicate (Mullite), K. S. Mazdiyasni, et al., Dec. 1972.
Coors Porcelain Company letter to Halliburton Services, Inc. dated Aug. 4, 1978 with Proposal to Supply Proppant.
Coors Porcelain Company letter to B. J. Hughes, Inc. dated Aug. 24, 1978 with Proposal to Supply Proppant.
Unimin Brochure, Unimin Canada Ltd., Mar. 1991.
Role of Impurities on Formation of Mullite from Kaolinite and $Al_2O_3$—$S_iO_2$ Mixtures, Johnson, Sylvia M. et al., Ceramic Bulletin, vol. 61, No. 8 (1982), pp. 838-842.
Bauxite and Alumina, Luke H. Baumgardner, et al., Minerals Yearbook, 1987, vol. I.
The Industrial Uses of Bauxite, N. V. S. Knibbs, D.Sc., 1928.
Bauxite, Cyril S. Fox, 1927.
Pages from the National Atlas of the United States of America.
Document entitled "Feb., Mar., Apr. 1998: Commercial Activity", with Exhibits A-D.
Document entitled "Jul. 1998: Commercial Activity", with Exhibit E.
Document entitled "Sep. 2001: Commercial Activity", with Exhibit F.
ScalePROP brochure, Schlumberger, Jan. 2002.
Rickards, A. R., et al.; "High Strength, Ultra Lightweight Proppant Development Lends New Dimensions to Hydraulic Fracturing Applications", SPE 84308, Oct. 7, 2003.
Didion International, Inc.; Mold & Core Consumables; http://www.moderncasting.com/MoreInfo/0602/FMI_Article_08.asp; Dec. 27, 2002.
Itochu Ceratech Corp.; Ceramics and Minerals Department; http://www.itc-cera.co.jp/english/cera.htm; Jun. 8, 2002.
Enprotech Corp; About Enprotech; http:www.enprotech.com/aboutus.html; Copyright 2004.
Spraying Systems Co.; Air Atomizing Nozzles ½J Pressure Spray Set-ups Internal Mix; Air Atomizing Nozzles ½J Series External Mix Set-ups; Air Atomizing Nozzles ½J Siphon/Gravity-Fed Spray Set-ups; pp. 358-362; Copyright 2003.
Spraying Systems Co.; Air Atomizing Nozzles ⅛J and ¼J Set-ups External Mix; pp. 282-285; Copyright 2003.
Spraying Systems Co.; Air Atomizing Nozzles Basic Information; pp. 268-269; Copyright 2003.
Spraying Systems Co.; Engineer's Guide to Spray Technology; Copyright 2000.
Environmental Conservation-Oriented Businesses; Itochu Corporation; pp. 11-16; Jul. 2004.
Itochu Ceratech Corporation; Cerabeads—Spherical Ceramic Sand; http://exhibits.gifa.de/exh/GMTN2003/e/3231240; Mar. 13, 2005.
Naigai Ceramics Co., Ltd.; Naigai Cerabeads 60; Aug. 1986.
"rock." Encyclopedia Britannica 2007. Encyclopedia Britannica Article. Jun. 27, 2007.
Perry's Chemical Enginners' Handbook Section 12, 7th Edition, 1997, pp. 12-81 to 12-90.
International Search Report mailed Aug. 29, 2006, by the ISA/US regarding International Application No. PCT/US2005/024339.
Written Opinion mailed Aug. 29, 2006, by the ISA/US regarding International Application No. PCT/US2005/024339.
International Preliminary Report on Patentability mailed Jan. 18, 2007, by the IB regarding International Application No. PCT/US2005/024339.
International Search Report mailed Oct. 4, 2006, by the ISA/US regarding International Application No. PCT/US2005/033092.
Written Opinion mailed Oct. 4, 2006, by the ISA/US regarding International Application No. PCT/US2005/033092.
International Preliminary Report on Patentability mailed Apr. 20, 2007, regarding International Application No. PCT/US2005/033092.
International Search Report mailed Jul. 13, 2007, by the ISA/US regarding International Application No. PCT/US2006/007308.
Written Opinion mailed Jul. 13, 2007, by the ISA/US regarding International Application No. PCT/US2006/007308.
International Preliminary Report on Patentability mailed Sep. 20, 2007, by the IB regarding International Application No. PCT/US2006/007308.
International Search Report mailed Jun. 8, 2007, by the ISA/US regarding International Application No. PCT/US2006/029234.
Written Opinion mailed Jun. 8, 2007, by the ISA/US regarding International Application No. PCT/US2006/029234.
International Preliminary Report on Patentability mailed Feb. 7, 2008, by the IB regarding International Application No. PCT/US2006/029234.
International Search Report mailed Dec. 27, 2007, by the ISA/US regarding International Application No. PCT/US2007/073247.
Written Opinion mailed Dec. 27, 2007, by the ISA/US regarding International Application No. PCT/US2007/073247.
International Preliminary Report on Patentability mailed Jan. 13, 2009, by the IB regarding International Application No. PCT/US2007/073247.
International Search Report mailed Feb. 22, 2008, by the ISA/US regarding International Application No. PCT/US2007/077290.
Written Opinion mailed Feb. 22, 2008, by the ISA/US regarding International Application No. PCT/US2007/077290.
International Preliminary Examination Report mailed Feb. 20, 2009, by the IB regarding International Application No. PCT/US2007/077290.
Correspondence from foreign counsel dated Nov. 29, 2007, regarding Office Action issued in connection with Eurasian Patent Application No. 200700296.
Correspondence from foreign counsel dated Feb. 29, 2008, regarding Office Action issued in connection with Eurasian Patent Application No. 200700583.
Correspondence from foreign counsel dated May 9, 2008, regarding Office Action issued in connection with Eurasian Patent Application No. 200700583.
Correspondence from foreign counsel dated Sep. 15, 2008, regarding Office Action issued in connection with Eurasian Patent Application No. 200700583.
Correspondence from foreign counsel dated Jul. 10, 2008, regarding Office Action issued in connection with Eurasian Patent Application No. 200701830.
Correspondence from foreign counsel dated Aug. 25, 2008, regarding Office Action issued in connection with Eurasian Patent Application No. 200800008.
First Office Action issued Jun. 19, 2009, by the State Intellectual Property Office, P.R. China, regarding Chinese Patent Application No. 200580030660.3.
Office Action issued Jun. 12, 2008, by the State Intellectual Property Office, P.R. China, regarding GCC Patent Application No. GCC/P/2005/4586.
Office Action issued Aug. 21, 2009, by the State Intellectual Property Office, P.R. China, regarding Chinese Patent Application No. 200680038963.4.
International Search Report mailed Oct. 6, 2008, by the US/ISA in connection with International Application No. PCT/US2008/069012.
Written Opinion mailed Oct. 6. 2008, by the US/ISA in connection with International Application No. PCT/US2008/069012.

* cited by examiner

PROPPANTS FOR GEL CLEAN-UP

CROSS-REFERENCE TO RELATED APPLICATIONS

This patent application is a non-provisional of U.S. Patent Application No. 60/948,384, filed on Jul. 6, 2007, entitled "Proppants for Gel Clean-Up," which is incorporated by reference herein in its entirety.

BACKGROUND

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped or flowed from the well. In many cases the permeability of the formation holding the gas or oil is insufficient for economic recovery of oil and gas. In other cases, during operation of the well, the productivity of the formation drops to the extent that further recovery becomes uneconomical. In such cases, it is necessary to hydraulically fracture the formation and prop the fracture in an open condition by means of a proppant material or propping agent. Such fracturing is usually accomplished by hydraulic pressure, and the proppant material or propping agent is a particulate material, such as sand, resin coated sand or ceramic particles (all of which can be referred to as "proppant"), which are carried into the fracture by means of a fracturing fluid, typically containing high molecular weight polymers, such as guar gum, guar gum derivatives such as hydroxypropyl guar (HPG), carboxymethyl HPG (CMHPG), cellulose, cellulose derivatives such as hydroxyethyl cellulose (HEC), biopolymers, such as xanthan gum and polyvinyl alcohol, which increase the viscosity of the fracturing fluid.

Crosslinking agents can also be added to the fracturing fluid to generate cross-linked gelled fluids so as provide even higher viscosities, better proppant transport properties and to create fracture geometries not possible with other types of fluids. These cross-linked gelled fluids are highly viscous but non-Newtonian and shear thinning permitting them to be easy placed. While the viscous nature of the fluids is important for proppant transport, once the proppant is placed in the fracture it is not desirable for such fluids to remain in the proppant pack as the fluids can significantly hinder the flow of oil or gas in the propped fracture. In recognition of this, the fracturing fluids include "breakers" of various types that are designed to break the cross-linking bonds and reduce the molecular weight of the polymeric materials in such fracturing fluids after the proppant is placed thus dramatically reducing the viscosity of the fracturing fluid and allowing it to be easily flowed back to the surface from the proppant pack. Such chemical breakers are typically added directly to the fluid. While the breakers are designed to break the cross-linking bonds and reduce the molecular weight of the polymeric materials in such fluids and significantly lower the viscosity of the fluids, it is important the breakers not reduce the fluid viscosity and transport capability prematurely while the fluid is being pumped. If a premature "break" of the fluid occurs during the fracturing operation, the loss of viscosity will dramatically limit the transport characteristics of the fracturing fluid. If this occurs while pumping, proppant can accumulate near the well bore rather than being carried into the created fracture. Such near well bore accumulation of proppant can lead to an early termination of a fracturing job due to excessive pumping pressure. This early termination is often referred to as a "screen out". Conventional techniques for attempting to avoid an early breaking of the fluid viscosity have included limiting the amount of breaker added to the fracturing fluid and/or encapsulating the breaker with a material that will limit the contact of the breaker with the high molecular weight and/or cross-linked polymers in the fracturing fluid during pumping.

Encapsulated breakers are simple pellets consisting entirely of breaker with a permeable coating. Such pellets are incorporated in a fracturing fluid along with the proppant in the anticipation that the breaker will be released and effectively break the surrounding gel. However, laboratory and field testing suggests that the "encapsulated breaker" pellets incorporated into a fracturing fluid are ineffective at contacting all the fracturing fluid, either due to physical separation/segregation of the proppant and encapsulated breaker pellets, or due to inadequate concentrations.

Other laboratory testing of conventional breaker systems demonstrates that such systems are often ineffective at removing the gel. The breakers are particularly poor at breaking and cleaning up the gel filter cake. A gel filter cake is often formed on the created fracture face during the hydraulic fracturing operation. The filter cake forms as hydraulic pressure in the fracture causes the liquid phase of the fracturing fluid to "leak off" into the permeable formation. The high molecular weight and/or cross linked gel particles are too large to enter the pores of the formation and consequently are filtered out at the fracture face creating a thin layer of highly concentrated gel referred to as a filter cake. This layer of filter cake is very resilient and can sometimes completely occlude the entire width of the created fracture upon closure.

DETAILED DESCRIPTION

Figure 1:
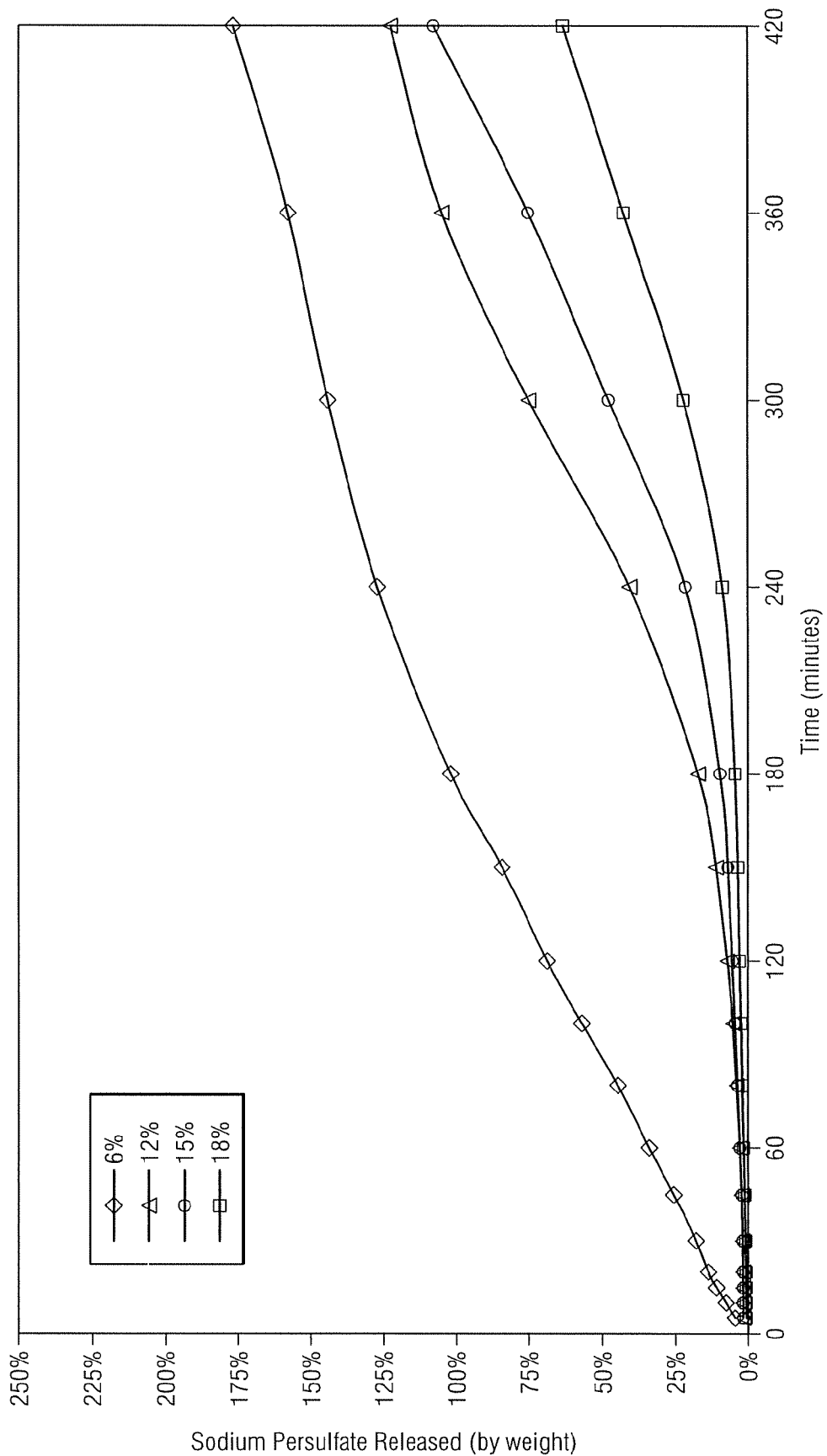
FIG. 1 is a graph of the release profile in terms of sodium persulfate released as a function of time for proppant coated with sodium persulfate and then coated again with polyvinylidene chloride.

Methods and compositions for breaking and removing residual gel and gel filter cake that results from the use of viscous gelled fracturing fluids are described. According to embodiments of the present invention, a gel breaking composition is coated on proppant grains, impregnated in the pore spaces of a porous ceramic proppant grain or both. Proppants for use in the methods and compositions of the present invention include lightweight ceramic proppants, intermediate strength ceramic proppants, high strength ceramic proppants, natural frac sands, glass beads, other ceramic bodies and resin coated proppants used in the hydraulic fracturing of oil and gas wells. Suitable proppants are disclosed for example in U.S. Pat. Nos. 4,068,718, 4,427,068, 4,440,866 and 5,188,175, the entire disclosures of which are incorporated herein by reference. According to such methods and compositions, the chemical reactivity of the gel breaking composition and the gel occurs in the immediate vicinity of the proppant grains.

According to certain embodiments of the present invention, gel breaking compositions come into intimate contact with a residual gel and a gel filter cake formed on the created fracture face during an hydraulic fracturing operation by placing the gel breaking composition on the surface of a proppant or in the pore spaces of a proppant grain and then controlling the release of the gel breaking composition into the fracturing fluid by further coating the solid or porous proppant grain with a secondary coating. According to such embodiments, the gel breaking compositions act to at least partially reduce the viscosity of the fracturing fluid and include, but are not limited to, one or more of enzymes, oxidizing agents, peroxides, persulfates, perborates, silver, iron, or copper catalysts, sodium bromate, acids, oxyacids and oxyanions of halogens, derivatives thereof, and combinations thereof or any other material well known to those of ordinary skill in the art that is effective to at least partially reduce the viscosity of the fracturing fluid. Examples of persulfates include sodium persulfate, ammonium persulfate and potassium persulfate. Examples of acids include fumaric acid, nitric acid, acetic acid, formic acid, hydrochloric acid, hydrofluoric acid and fluroboric acid. Examples of oxyacids and oxyanions of halogens include hypochlorous acid and hypochlorites, chlorous acid and chlorites, chloric acid and chlorates, and perchloric acid and perchlorate.

According to certain embodiments of the present invention, the gel breaking composition coating is applied to the surface of the proppant or impregnated in the pore spaces of a porous ceramic proppant grain by one or more of a variety of techniques well known to those of ordinary skill in the art including spraying, dipping or soaking the proppant in a liquid solution of the gel breaking composition. Those of ordinary skill in the art will recognize that other techniques may also be used to suitably apply a substantially uniform consistent coating to the proppant or to impregnate a porous proppant.

Also according to certain embodiments of the present invention, the secondary coating comprises any coating material that is well known to those of ordinary skill in the art that is permeable, is dissolved by water or hydrocarbons, melts or degrades at reservoir temperature, or fails upon application of mechanical stress. The secondary coating is generally a polymer, wax, monomer, oligomer or a mixture thereof. In certain embodiments, the secondary coating comprises polyvinylidene chloride. Generally, the secondary coating may be applied to the surface of the proppant coated or impregnated with the gel breaking composition by one or more of a variety of techniques well known to those of ordinary skill in the art including spraying, dipping or soaking in a liquid solution of the secondary coating. In addition, the secondary coating may be applied by a droplet spraying technique in which discrete droplets of the secondary coating are sprayed onto the proppant grains to create a permeable matrix of the secondary coating. The secondary coating may also be applied by other methods well known to those of ordinary skill in the art such as microencapsulation techniques including fluidized bed processes, top spray methods, as well as other methods of coating such as disclosed in U.S. Pat. No. 6,123,965, the entire disclosure of which is incorporated herein by reference.

According to certain embodiments of the present invention, the surface of a proppant grain is coated with a sodium persulfate breaker wherein the breaker coating constitutes 10% by weight of the coated proppant. The amount or thickness of the breaker coating can be tailored to provide the optimal breaking action for the specific well conditions. The proppant grain is then coated with a polyvinylidene chloride by a droplet spraying technique wherein the polyvinylidene chloride coating constitutes 6-18% by weight of the proppant when coated with polyvinylidene chloride and sodium persulfate breaker. The polyvinylidene chloride coating is permeable such that when the coated proppant is placed in an aqueous solution at 160° F., significant release of the breaker to the solution is delayed by up to 4 hours or more.

FIG. 1 shows the release profile for the release of sodium persulfate as a function of time at 160° F. for varying amounts of a permeable coating of polyvinylidene chloride on a lightweight ceramic proppant which is commercially available under the tradename ECONOPROP® from CARBO Ceramics Inc. The lightweight proppant was first coated with a sodium persulfate breaker composition such that the breaker composition accounted for 10% of the weight of the coated proppant. Then the sodium persulfate coated proppant was coated with polyvinylidene chloride such that the polyvinylidene chloride constituted from 6% to 18% of the weight of final proppant product.

According to certain embodiments of the present invention, 10% by weight of a sodium persulfate breaker is placed or impregnated in the pore spaces of a porous ceramic proppant grain. The porous proppant grain is then coated with a polyvinylidene chloride by a droplet spraying technique wherein the polyvinylidene chloride coating constitutes 6-18% by weight of the proppant when coated with polyvinylidene chloride and sodium persulfate breaker. The polyvinylidene chloride coating is permeable such that when the coated proppant is placed in an aqueous solution at 160° F., significant release of the breaker to the solution is delayed by up to 4 hours or more.

Figure 2:
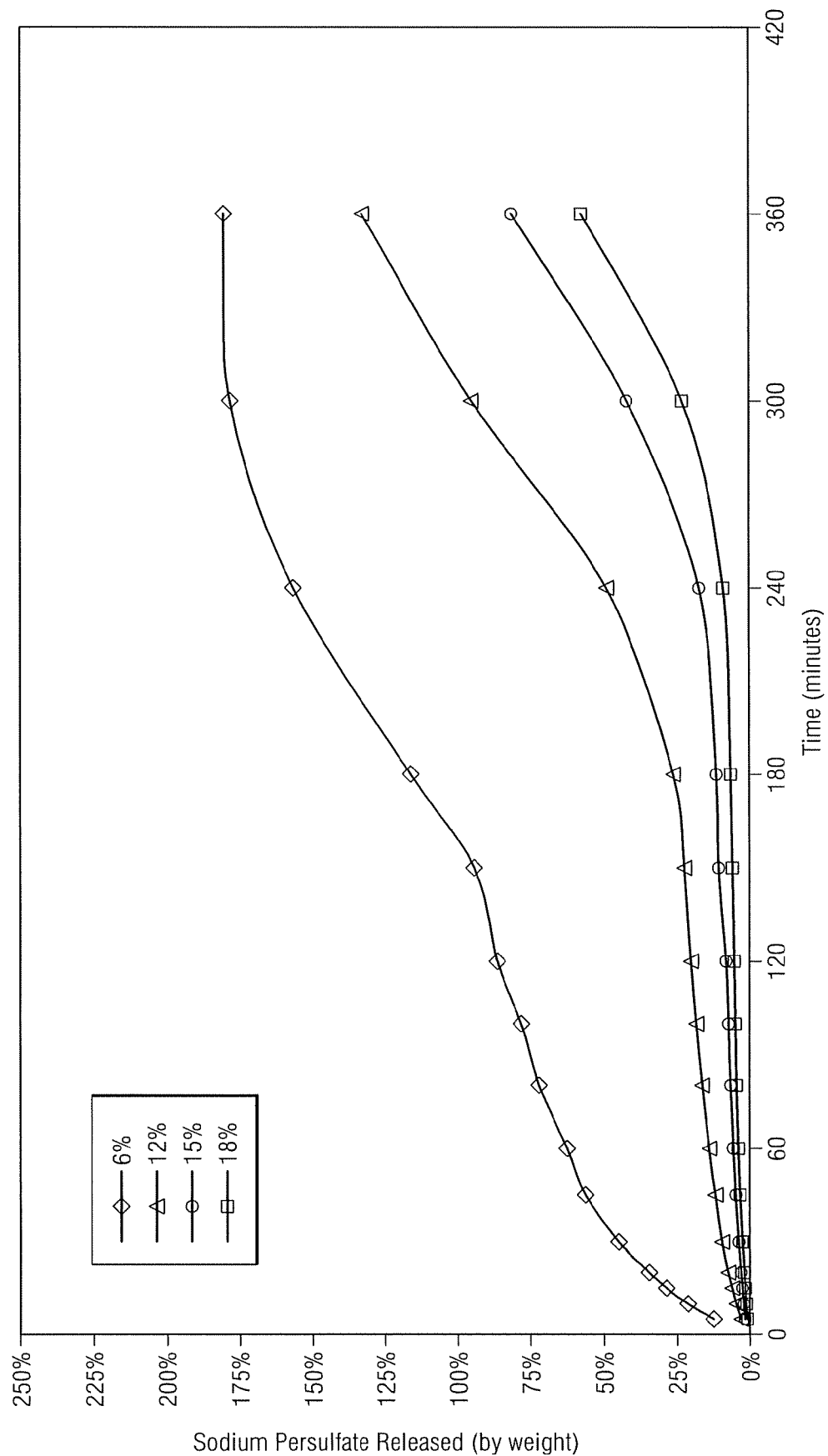
FIG. 2 is a graph of the release profile in terms of sodium persulfate released as a function of time for porous proppant impregnated with sodium persulfate and then coated with polyvinylidene chloride.

FIG. 2 shows the release profile for the release of sodium persulfate as a function of time at 160° F. for varying amounts of a permeable coating of polyvinylidene chloride on a porous ceramic proppant which is commercially available under the tradename ULTRALITE® from CARBO Ceramics Inc. The porous ceramic proppant was first impregnated with a sodium persulfate breaker composition such that the breaker composition accounted for 10% of the weight of the impregnated proppant. Then the sodium persulfate impregnated proppant was coated with polyvinylidene chloride such that the polyvinylidene chloride constituted from 6% to 18% of the weight of final proppant product.

Certain embodiments of the present invention in which the proppant grain is coated with a breaker or a breaker is impregnated in the pore spaces of a porous proppant and the release of the breaker is delayed by coating it with a secondary coating, enable the incorporation of a high level of the breaker into the site of a fracture during a hydraulic fracturing process and improve the contact of the breaker with the gel or filter cake that remains in the proppant pack.

Breakers such as sodium persulfate are typically added to the viscous fracturing fluid at a concentration of about 0.1-4 pounds per 1000 gallons of fluid. By incorporating the breaker on or into the proppant and then delaying the release of the breaker by means of a permeable outer layer, it is possible to significantly increase the effective concentration of the breaker in the fluid and at the same time avoid a premature break of the fluid.

The foregoing description and embodiments are intended to illustrate the invention without limiting it thereby. It will be obvious to those skilled in the art that the invention described herein can be essentially duplicated by making minor changes in the material content or the method of manufacture. To the extent that such material or methods are substantially equivalent, it is intended that they be encompassed by the following claims.

What is claimed:
1. A gas and oil well proppant comprising:
a plurality of spherical particles, wherein the surface of each of the particles is coated with a layer of a gel breaker composition and the gel breaker composition is selected from the group consisting of enzymes, oxidizing agents, peroxides, persulfates, perborates, silver, iron, or copper catalysts, sodium bromate, acids, oxyacids and oxyanions of halogens, derivatives thereof, and combinations thereof; and the layer of a gel breaker composition is coated with an outer layer of polyvinylidene chloride, wherein the outer layer of polyvinylidene chloride delays the release of the gel breaker composition.

2. The proppant of claim 1 wherein the proppant is selected from the group consisting of a lightweight ceramic proppant, an intermediate strength ceramic proppant, a high strength ceramic proppant, a natural frac sand, a porous ceramic proppant, glass beads, and other ceramic body or resin coated proppants.

3. The proppant of claim 1 wherein the gel breaker comprises from 1 to 10% by weight of the proppant.

4. The proppant of claim 1 wherein the outer layer of polyvinylidene chloride comprises from 6 to 18% by weight of the proppant.

5. A gas and oil well proppant comprising:

a plurality of spherical porous particles, wherein a gel breaker composition is impregnated in the pore space of the particles and the gel breaker composition is selected from the group consisting of enzymes, oxidizing agents, peroxides, persulfates, perborates, silver, iron, or copper catalysts, sodium bromate, acids, oxyacids and oxyanions of halogens, derivatives thereof, and combinations thereof; and the particles are coated with an outer layer of polyvinylidene chloride that delays the release of the gel breaker composition.

6. The proppant of claim 5 wherein the proppant comprises porous ceramic particles.

7. The proppant of claim 5 wherein the gel breaker comprises from 1 to 10% by weight of the proppant.

8. The proppant of claim 5 wherein the outer layer of polyvinylidene chloride comprises from 6 to 18% by weight of the proppant.

9. The proppant of claim 5 wherein the surface of the particles impregnated with a gel breaker composition is coated with a layer of the gel breaker composition and the layer of the gel breaker composition is coated with the outer layer of polyvinylidene chloride.

10. A method of hydraulically fracturing a hydrocarbon formation comprising pumping a gelled fracturing fluid and incorporating into the fluid a propping agent in which all or a fraction of such propping agent has been coated on its surface with a gel breaker, wherein the gel breaker composition is selected from the group consisting of enzymes, oxidizing agents, peroxides, persulfates, perborates, silver, iron, or copper catalysts, sodium bromate, acids, oxyacids and oxyanions of halogens, derivatives thereof, and combinations thereof; and further coated with an outer layer of polyvinylidene chloride that permits a delayed release of the breaker.

11. A method of hydraulically fracturing a hydrocarbon formation comprising pumping a gelled fracturing fluid and incorporating into the fluid a propping agent in which all or a fraction of such propping agent being a porous proppant that has been impregnated with a gel breaker, wherein the gel breaker composition is selected from the group consisting of enzymes, oxidizing agents, peroxides, persulfates, perborates, silver, iron, or copper catalysts, sodium bromate, acids, oxyacids and oxyanions of halogens, derivatives thereof, and combinations thereof; and further coated with an outer layer of polyvinylidene chloride that permits a delayed release of the breaker.

* * * * *